United States Patent [19]
Bennöhr et al.

[11] Patent Number: 5,656,938
[45] Date of Patent: Aug. 12, 1997

[54] TEMPERATURE COMPENSATION IN MASS FLOW SENSORS EMPLOYING THE HOT-WIRE ANEMOMETER PRINCIPLE

[75] Inventors: Thomas Bennöhr, Braunschweig; Michael Daetz, Tiddische, both of Germany

[73] Assignee: DAUG Deutsche Automobilgesellschaft mbH, Braunschweig, Germany

[21] Appl. No.: 378,259

[22] Filed: Jan. 26, 1995

[30] Foreign Application Priority Data

Feb. 12, 1994 [DE] Germany .................. 44 04 506.9

[51] Int. Cl.$^6$ .................................................. G01F 1/68
[52] U.S. Cl. .................. 324/706; 73/204.19; 73/118.2
[58] Field of Search .................... 324/706; 29/611, 29/619; 73/204.18, 204.19, 118.2

[56] References Cited

U.S. PATENT DOCUMENTS

| | | | |
|---|---|---|---|
| 4,938,061 | 7/1990 | Carp | 73/204.19 |
| 5,020,214 | 6/1991 | Tsuroka et al. | 29/611 |

FOREIGN PATENT DOCUMENTS

| | | |
|---|---|---|
| 0276380 | 8/1988 | European Pat. Off. . |
| 0374352 | 6/1990 | European Pat. Off. . |
| 3433368 | 3/1986 | Germany . |
| 3603010 | 8/1986 | Germany . |
| 3736709 | 5/1988 | Germany . |
| 3802422 | 8/1989 | Germany . |
| 3806764 | 9/1989 | Germany . |
| 3931308 | 3/1991 | Germany . |
| 4022940 | 1/1992 | Germany . |
| 3402981 | 8/1992 | Germany . |
| 3433368 | 10/1992 | Germany . |

Primary Examiner—Kenenth A. Wieder
Assistant Examiner—Barry E. Bowser
Attorney, Agent, or Firm—Spencer & Frank

[57] ABSTRACT

For determining the air mass flow in the intake pipe of an internal combustion engine by means of an electrical bridge, normally the current flowing through the current measurement resistor when balancing the bridge is evaluated as an indirect measure of the air mass flow. The primary measured quantity for the air mass flow is, however, the power converted at the air flow measurement resistor around which the air flows so that the indirect measurement always includes an error. To reduce this measurement error, the invention utilizes the evaluation of the sum of the voltage across the current measurement resistor and the voltage or a partial-voltage across the air flow measurement resistor as a measure of the air flow.

6 Claims, 1 Drawing Sheet

TEMPERATURE COMPENSATION IN MASS FLOW SENSORS EMPLOYING THE HOT-WIRE ANEMOMETER PRINCIPLE

BACKGROUND OF THE INVENTION

The invention relates to a circuit arrangement for the measurement of air mass employing the hot-wire anemometer principle, in particular for motor vehicles with an internal combustion engine.

A circuit arrangement of this kind is known from the publication DE-OS 38 02 422 and is shown in principle in FIG. 3. This known circuit arrangement consists of an electrical bridge with two bridge arms. One of these arms is an air flow measurement resistor $R_L$ around which the air flows and connected in series with a current measurement resistor $R_1$. The other arm is a temperature compensation resistor $R_T$ that detects the air temperature and is followed by a correction resistor $R_K$ connected in series with a fixed resistor $R_2$. The air flow measurement resistor $R_L$ and the temperature compensation resistor $R_T$ are, for example, hot-film sensors with positive temperature coefficients with identical temperature characteristics. The difference voltage in the bridge diagonal branch is picked up by a differential amplifier $U_1$ and serves to balance the bridge.

The current flowing through the current measurement resistor $R_1$ after the bridge has been balanced, or the voltage $U_M$ across the current measurement resistor $R_1$ after the bridge has been balanced, is taken as measurement for the momentary air mass flow.

The measuring bridge is always regulated with the help of the differential amplifier $U_1$ such that the bridge is balanced for every air flow and temperature state, i.e., the differential amplifier $U_1$ varies the current through the air flow measurement resistor $R_L$ until the bridge difference voltage measured by the differential amplifier $U_1$ becomes zero. In so doing, the air flow measurement resistor $R_L$ heats up and its resistance value changes in accordance with its temperature characteristics.

The circuit represents a constant resistance regulator in which the resistance of the air flow measurement resistor $R_L$ behaves in accordance with the following formula:

$$R_L(T)=(R_T(T)+R_K)\cdot R_1/R_2 \qquad (1)$$

When the bridge is in the steady state according to FIG. 3, the power $P_{se}$ supplied to the air flow measurement resistor $R_L$ is just as great as the power output from this air flow measurement resistor $R_L$ to the fluid flowing by. The resistance values in the bridge are so selected that a preferably constant temperature of approximately 130° K. above that of the fluid flowing past settles in. A change in the value of the fixed resistor $R_2$ causes a change in the overtemperature level, while changes to the correction resistor $R_K$ influence the effects of the temperature sensing with the temperature compensation resistor $R_T$. The correction resistor $R_K$ thus determines whether, when the fluid temperature rises, the over temperature also rises, falls or preferably remains constant on account of the shorter response time when there is a change in temperature.

For the current $I_{se}$ flowing through the air flow measurement resistor $R_L$, the following formula applies:

$$I_{se}=K_0\cdot(P_{se}/R_L)^{1/2} \qquad (2)$$

where $K_0$ is a constant. The output voltage $U_m$, which represents a measure for the air flow, is a function of the mass flow (dm/dt) in accordance with King's Law as defined by the following formula:

$$U_M=K_1+K_2\cdot(dm/dt)^{1/4} \qquad (3)$$

where $K_1$ and $K_2$ are constants.

The primary measured quantity of a hot-wire, or hot-film, anemometer is the power converted at the air flow measurement resistor $R_L$. Since the temperature compensation resistance $R_T$ varies with the temperature of the fluid, according to equation (1) above the resistance value of the air flow measurement resistor $R_L$ will also vary, so that a constant resistance regulator is provided basically only for discrete temperatures. In order to detect the power converted at the air flow measurement resistor $R_L$, it is therefore actually necessary to detect the power $P_{se}$ converted at this resistor. Normally, however, only the current $I_{se}$ is evaluated by the current measurement resistor $R_1$, which means that an error always results in determining the power. Since the air mass flow must always be acquired as a measured quantity, however, this error is almost compensated because calculations of the heat transfer coefficient α show that for the same mass flow the power that can be converted at the air flow measurement resistor $R_L$ rises with temperature. The resistance value of the air flow measurement resistor $R_L$ also increases with rising temperature so that the current $I_{se}$ that settles in is in fact approximately constant (King's Law). However, there remains a residual gradient with respect to temperature that causes an error of between 2 and 5% referred to the measured value in the temperature range that is of interest for motor vehicle applications.

SUMMARY OF THE INVENTION

The object of the invention is to provide a circuit arrangement of the type described at the outset allowing temperature compensation to be achieved by simple means.

Pursuant to the invention, the sum of the voltages across the current measurement resistor and the voltage across the air flow measurement resistor or the sum of the voltage across the current measurement resistor and a partial voltage across the air flow measurement resistor is evaluated as a measure of the air flow.

In order to generate a partial voltage across the air flow measurement resistor, a voltage divider is connected in parallel to this resistor so that the measured voltage is the sum of the voltage across the current measurement resistor and the partial voltage at this voltage divider. This voltage divider is set in such a way that the temperature gradient of the partial voltage is compensated by the temperature gradient of the current flowing through the current measurement resistor. The values of the partial resistances are greater than the value of the air flow measurement resistance by several orders of magnitude.

With an electrical bridge of this kind, a high measuring accuracy is obtained over the significant temperature range. The setting of the bridge is independent of the temperature compensation setting.

In a preferred further development, the voltage divider can be made up of two partial resistors so that the partial voltage that is significant for the measured voltage occurs at the partial resistor that is connected directly to the current measurement resistor.

However, if the measured voltage is made up of the sum of the voltages at the air flow measurement resistor and the current measurement resistor and if additionally a correction resistor is connected in series with the temperature compensation resistor, then for the purpose of temperature compensation this temperature compensation resistor and the correction resistor are set in such a way that the temperature gradient of the measured voltage is compensated.

BRIEF DESCRIPTION OF THE DRAWINGS

The invention will now be described and explained by means of embodiment examples together with the drawings wherein.

DESCRIPTION OF THE PREFERRED EMBODIMENTS

Figure 1:
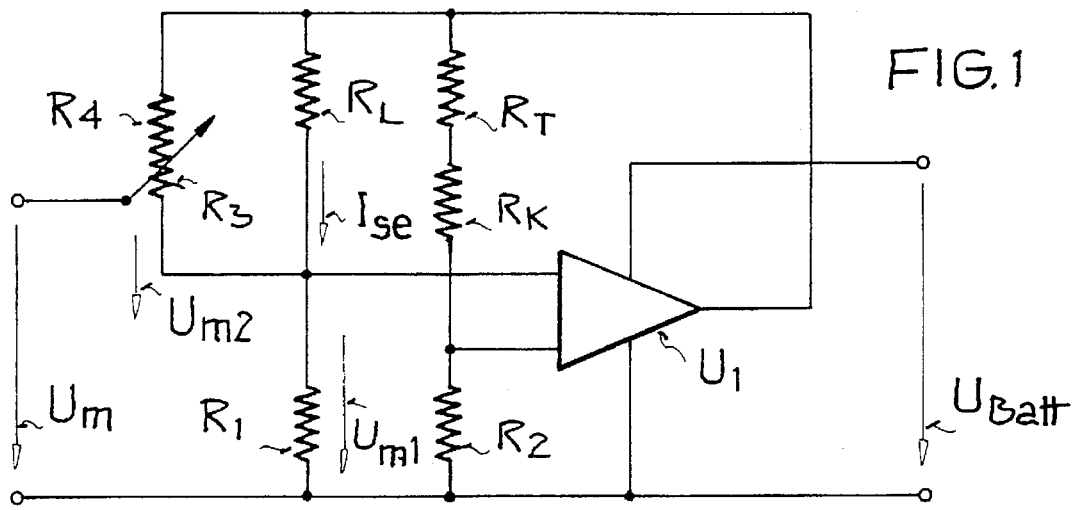
FIG. 1 is a circuit diagram of a first embodiment example of the circuit arrangement in accordance with the invention having a voltage divider connected in parallel to the air flow measurement resistor.
Figure 3:
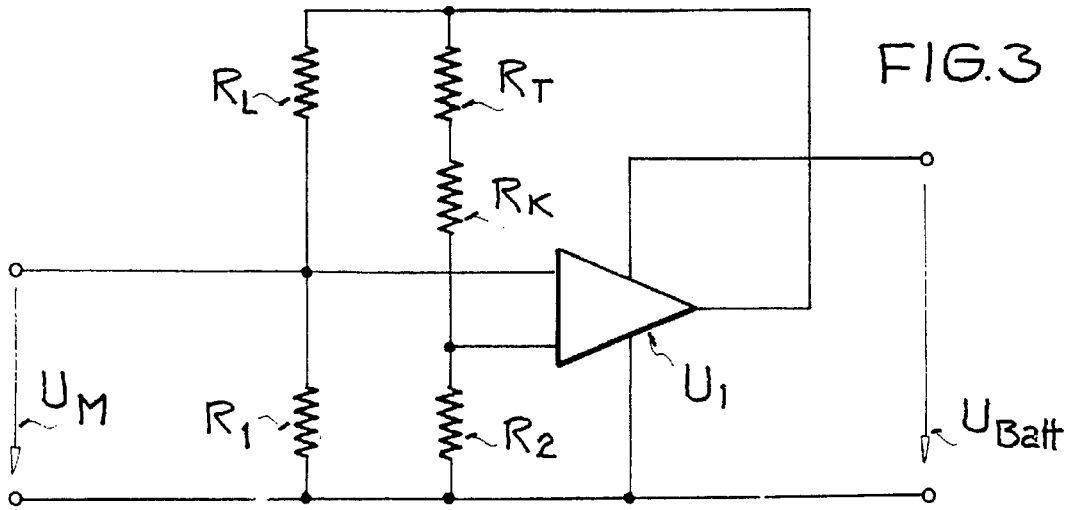

The circuit arrangement according to FIG. 3, which is state of the art and already described above, differs from that according to FIG. 1 only in that a voltage divider made up of two resistors $R_3$ and $R_4$ is connected in parallel to the air flow measurement resistor $R_L$. The total resistance of this voltage divider is approximately 30 k$\Omega$, whereas the resistance of the air flow measurement resistor $R_L$ is approximately 10 $\Omega$. The resistance ratio of the two resistors $R_L$ and $R_T$, however, is approximately 1:100.

Complete temperature compensation is achieved with this circuit arrangement by setting the voltage divider $R_3/R_4$ in such a way that the temperature gradient of the current $I_{se}$ compensates the opposite temperature gradient of the voltage drop $U_{m2}$ which occurs across the partial resistor $R_3$ of the voltage divider. The measurement voltage $U_m$ is made up of the voltage $U_{ml}$ across the current measurement resistor $R_1$ and the partial voltage $U_{m2}$ across the partial resistor $R_3$ and is characterized by the following formula:

$$U_m = K_3 \cdot (P_{se}/R_L)^{1/2} + K_4 \cdot (P_{se} \cdot R_L)^{1/2}$$

where $K_3$ and $K_4$ are constants. Since the values of the partial resistors $R_3$ and $R_4$ are greater than the value of the air flow measurement resistance $R_L$ by several orders of magnitude, as can be seen from the values given above, the bridge is set independently of the temperature compensation setting. Since both terms in the above equation (4) always behave in accordance with King's Law, this combination can also be formulated again in accordance with equation (3).

Figure 2:
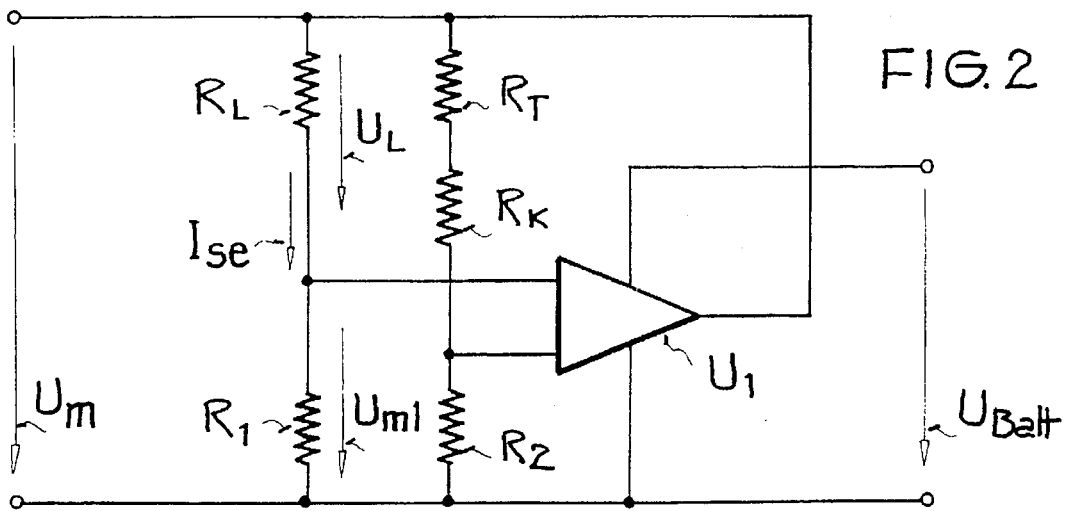
FIG. 2 is a circuit diagram of a further embodiment example of the circuit arrangement in accordance with the invention, where the measured voltage is picked off at the series circuit comprising the air flow measurement resistor and the current measurement resistor; and, FIG. 3 is a circuit diagram of a known measuring circuit.

The further embodiment example according to FIG. 2 shows a state-of-the-art bridge corresponding to FIG. 3 but where the measurement signal $U_m$ is not generated across the current measurement resistor $R_1$ but is picked off at the series circuit comprising the current measurement resistor $R_1$ and the air flow measurement resistor $R_L$. The measurement signal $U_m$ is therefore the sum of the voltage $U_{ml}$ across the current measurement resistor $R_1$ and the voltage $U_L$ across the air flow measurement resistor $R_L$. In order to achieve temperature compensation in such a circuit arrangement, however, it is necessary to forego the advantage of a constant over temperature as provided for in the circuit arrangement according to FIG. 1. Temperature compensation is achieved with the correction resistor $R_K$ and the fixed resistor $R_2$ by setting these in such a way that the temperature gradient of the measurement voltage $U_m$ is compensated. The advantage of this circuit arrangement is that the measurement signal $U_m$ is considerably greater than in the case of the first described embodiment example.

What is claimed is:

1. Circuit arrangement for the measurement of air mass employing the hot-wire anemometer principle, in particular for motor vehicles with an internal combustion engine, said circuit comprising: a bridge circuit in one bridge arm of which there is an air flow measurement resistor around which the air flows and that is connected in a series with a current measurement resistor, and in the other bridge arm of which there is a temperature compensation resistor that detects the air temperature and that is connected in series with fixed resistor, means for detecting the bridge difference voltage in the diagonal branch of the bridge circuit and for using the difference voltage to control the supply voltage applied across the arms of the bridge circuit for balancing the bridge circuit, and output means connected to the bridge circuit for providing a measured output voltage, obtaining after bridge balancing, representing the sum of the voltage across the current measurement resistor and a partial voltage across the air flow measurement resistor as a measure for the air flow.

2. Circuit arrangement for the measurement of air mass employing the hot-wire anemometer principle, in particular for motor vehicles with an internal combustion engine, said circuit comprising: a bridge circuit in one bridge arm of which there is an air flow measurement resistor around which the air flows and that is connected in series with a current measurement resistor, and in the other bridge arm of which there is a temperature compensation resistor that detects the air temperature and that is connected in series with a fixed resistor, means for detecting the bridge difference voltage in the dead branch of the bridge and for using the difference voltage to control the supply voltage applied across the arms of the bridge circuit for balancing the bridge circuit; and output means connected to the bridge circuit for providing a measured voltage, obtained after bridge balancing, representing the sum of the voltage across the current measurement resistor and the voltage across the air flow measurement resistor as a measure for the air flow.

3. Circuit arrangement in accordance with claim 2, wherein a correction resistor is connected in series with the temperature compensation resistor.

4. Circuit arrangement in accordance with claim 1, wherein:
a) To generate the partial voltage across the air flow measurement resistor, a voltage divider is connected in parallel with the air flow measurement resistor;
b) the measured voltage results from the sum of the voltage across the current measurement resistor and a partial voltage across the voltage divider;
c) the voltage divider is set such that the temperature gradient of the partial voltage is compensated by the temperature gradient of the current flowing through the current measurement resistor; and
d) the resistance values of the partial resistors of the voltage divider are greater than the resistance value of the air flow measurement resistor by several orders of magnitude.

5. Circuit arrangement in accordance with claim 4, wherein the voltage divider has two series connected partial resistors and wherein the partial voltage that is significant for the measurement voltage arises across the partial resistor connected directly to the current measurement resistor.

6. Circuit arrangement in accordance with claim 5, wherein a correction resistor is connected in series with the temperature compensation resistor.

* * * * *